(12) United States Patent
Guillet et al.

(10) Patent No.: US 11,787,722 B2
(45) Date of Patent: Oct. 17, 2023

(54) TRANSLATABLY MOBILE BATCH CHARGER

(71) Applicant: SAINT-GOBAIN ISOVER, Courbevoie (FR)

(72) Inventors: Antoine Guillet, Paris (FR); Frédéric Lopepe, Rosny Sous Bois (FR); Sébastien Chesnel, Angouleme (FR); Andrea Ranzani Da Costa, Creteil (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 145 days.

(21) Appl. No.: 16/765,747

(22) PCT Filed: Nov. 29, 2018

(86) PCT No.: PCT/FR2018/053038
§ 371 (c)(1),
(2) Date: May 20, 2020

(87) PCT Pub. No.: WO2019/106301
PCT Pub. Date: Jun. 6, 2019

(65) Prior Publication Data
US 2020/0290912 A1 Sep. 17, 2020

(30) Foreign Application Priority Data
Nov. 30, 2017 (FR) ...................................... 1761399

(51) Int. Cl.
*C03B 3/00* (2006.01)
*C03B 5/04* (2006.01)
*F27D 3/08* (2006.01)

(52) U.S. Cl.
CPC ................ *C03B 3/005* (2013.01); *C03B 5/04* (2013.01); *F27D 3/08* (2013.01)

(58) Field of Classification Search
None
See application file for complete search history.

(56) References Cited

U.S. PATENT DOCUMENTS 2,910,200 A * 10/1959 Olson ....................... C03B 3/00
414/804
3,200,971 A * 8/1965 Trethewey ................ C03B 3/00
73/302

(Continued)

FOREIGN PATENT DOCUMENTS

FR 2 629 074 A3 9/1989
GB 191310207 A 3/1914

(Continued)

OTHER PUBLICATIONS

International Search Report as issued in International Patent Application No. PCT/FR2018/053038, dated Apr. 1, 2019.

*Primary Examiner* — Jodi C Franklin
(74) *Attorney, Agent, or Firm* — Pillsbury Winthrop Shaw Pittman LLP

(57) ABSTRACT

A batch charger includes a barrel defining a direction X of charging a glass forming batch into the furnace, and a mechanical assembly provided with a member for conveying the batch to the furnace in the charging direction X, this conveying member being at least partially arranged in the barrel, and a motorized unit for driving the conveying member. The batch charger includes a mechanical assembly translatably mobile relative to the barrel, in the charging direction X.

18 Claims, 2 Drawing Sheets

(56) References Cited

U.S. PATENT DOCUMENTS

| | | | | |
|---|---|---|---|---|
| 3,573,017 A * | 3/1971 | Griem, Jr. | | C03B 5/24 65/29.21 |
| 3,741,742 A * | 6/1973 | Jennings | | C03B 5/245 65/480 |
| 3,779,731 A * | 12/1973 | Pollock | | C03B 5/24 700/157 |
| 3,856,496 A * | 12/1974 | Nesbitt | | C03B 5/235 65/346 |
| 3,954,433 A * | 5/1976 | Holler | | C03B 5/24 373/40 |
| 4,028,083 A * | 6/1977 | Patznick | | G05D 23/22 65/29.21 |
| 4,194,077 A * | 3/1980 | Canfield | | G01F 23/246 65/335 |
| 4,302,623 A * | 11/1981 | Canfield | | G01F 23/2962 73/290 V |
| 4,312,658 A * | 1/1982 | Mayer | | C03B 3/00 65/335 |
| 4,492,587 A * | 1/1985 | Fletcher | | F27B 19/00 423/594.17 |
| 5,123,942 A * | 6/1992 | Argent | | C03B 3/00 65/335 |
| 5,134,627 A * | 7/1992 | Crouse | | C03B 3/00 373/28 |
| 5,218,617 A * | 6/1993 | Herrera-Garcia | | F27B 3/18 266/200 |
| 5,869,810 A * | 2/1999 | Reynolds | | F27D 99/0006 219/427 |
| 6,349,570 B1 * | 2/2002 | Coates | | B01F 35/833 366/168.1 |
| 7,926,301 B2 * | 4/2011 | Johnson | | C03B 5/245 65/29.17 |
| 9,394,192 B2 * | 7/2016 | Villeroy De Galhau | | C03B 3/00 |
| 11,358,895 B2 * | 6/2022 | Rashley | | C03B 5/44 |
| 2013/0167587 A1 * | 7/2013 | Lindig | | C03B 3/005 65/335 |
| 2015/0013386 A1 * | 1/2015 | Villeroy De Galhau | | C03B 5/2353 65/335 |
| 2015/0232373 A1 * | 8/2015 | Spitler | | C03B 5/04 156/62.4 |
| 2015/0307382 A1 * | 10/2015 | Wang | | C03B 3/026 65/335 |
| 2016/0023936 A1 * | 1/2016 | Lindig | | C03B 3/023 414/196 |
| 2016/0333511 A1 * | 11/2016 | Spitler | | C03B 37/0213 |
| 2017/0145314 A1 * | 5/2017 | Parkinson | | B65G 33/14 |
| 2018/0354836 A1 * | 12/2018 | Hansen | | F27B 3/18 |
| 2019/0161377 A1 * | 5/2019 | Cowles | | C03B 5/2356 |

FOREIGN PATENT DOCUMENTS

| | | |
|---|---|---|
| SU | 1377246 A1 | 2/1988 |
| WO | WO 2013/132184 A1 | 9/2013 |
| WO | WO 2016/120351 A1 | 8/2016 |

* cited by examiner

TRANSLATABLY MOBILE BATCH CHARGER

CROSS-REFERENCE TO RELATED APPLICATIONS

This application is the U.S. National Stage of PCT/FR2018/053038, filed Nov. 29, 2018, which in turn claims priority to French patent application number 1761399 filed Nov. 30, 2017. The content of these applications are incorporated herein by reference in their entireties.

The present invention relates to a batch charger for a glass furnace and an installation for melting a glass forming batch. It relates more particularly to installations for forming flat glass such as float or rolling installations, as well as installations for forming hollow glass such as bottles and phials, and more particularly installations for forming glass fibers of the mineral wool type for thermal or sound insulation or so-called reinforcing textile glass yarn.

The invention also relates to a system for controlling such a batch charger together with the associated control method, computer program and computer-readable recording medium.

Melting installations are provided with a device for charging a glass forming batch into a glass furnace. These glass formers are generally of the oxide type, and generally comprise at least 30% by weight of silica, such as a glass or a silicate such as an alkaline and/or alkaline earth silicate. The glass can in particular be soda-lime-silica glass or rock glass, often called "black glass" by a person skilled in the art. The terms "glass formers" and "raw materials" therefore aim to encompass the materials necessary to obtain a vitreous (or ceramic or vitroceramic) matrix, such as silica sand, rock, blast furnace slag, as well as all of the additives (refining additives), demolition waste (including mineral fibers), all of the liquid or solid fuels, if applicable (plastic from composite or other material, organic material, coal) and all types of cullet. In the description, the expressions "liquid glass" and "melt" denote the product of melting these glass formers.

Charging devices, also known as "batch chargers", conventionally belong to one of the following two groups:

Above-surface batch chargers with a tray or pusher installed in a doghouse, outside the melting end, So-called "submerged" batch chargers, which distribute the batch directly inside the melting end, at a level below the level of the molten glass formers.

More specifically, the use is known of a batch charger comprising:

a barrel defining a charging direction of the batch into the furnace, a member for conveying the batch to the furnace in the charging direction, this conveying member being at least partially arranged in the barrel, and a motorized unit for driving said conveying member.

This conveying member can be a piston, as described in WO2016/120351A, or one or more worm screws, as described in WO2013/132184, the body of the batch charger being in this case for example of the single-screw or twin-screw extruder type. The member for conveying the batch to the furnace is translated (in the case of a piston) or rotated (in the case of a screw) by a motorized drive unit that can comprise one or more motors.

In this situation, resistance generated in particular by the batch being conveyed counters the work supplied by the conveying member. This resistance increases with the hardness and particle size of the batch, the thickness of the plug, i.e. the contact area with the end of the batch charger close to the furnace, and the plug sticking to the inlet to the melting chamber, as well as with the height and viscosity of the melt exerting pressure on the plug. In a known manner, the increase in this resistance results in an increase in power from the drive motor.

When, following the increase in resistance, the power delivered by the motor reaches a maximum limit value, predetermined by the sizing of the motor, the different components of the batch charger, and in particular the conveying member and/or drive motor thereof tend to jam, which can result in damage thereto. In addition, assuming that the conveying member is eventually freed following the increase in power from the motor, a relatively significant weight of batch can be delivered into the melting chamber, then causing a drop in temperature and therefore instabilities in the melting process.

Conversely, a drop in the resistance exerted by the glass forming batch generally indicates that the plug has become too thin. The batch charger is then exposed to the intrusion into the barrel of combustion gases from the furnace, or in other words, "a back flow of gas". Such a back flow of gas must be avoided at all costs, as it tends to heat the glass former in the barrel. This then results in rapid damage to the components of the batch charger, which are not suitable for exposure to such high temperatures. This temperature rise also increases the risks of the glass former catching fire, and even of an explosion. The release of such gases into the atmosphere also represents a risk for the operator, given the toxicity of the gases in question, and for the environment, due to the polluting nature thereof.

Faced with these difficulties, it is known to oversize the drive motor so that the instantaneous power thereof makes it possible for the glass forming batch to be conveyed into the furnace. This technical solution is however highly unsatisfactory as it does not make it possible to adjust the batch charger to the variable conditions of the charging operation. Thus, the resistance exerted by the agglomerate formed by the batch for charging varies significantly depending on the hardness and particle size thereof. A batch charger sized for a given batch will therefore be unsuitable for or poorly suited to charging a different type of batch. In addition, such sizing of the motor does not make it possible to limit the risks of damage to the conveying member during a torque increase. This is particularly the case when this member is subjected to asymmetrical stresses, for example when conveying a very heterogeneous batch or when a plug of variable thickness has formed. Finally, such a solution in no way makes it possible to prevent the generation of instabilities in the melting process or back flows of gas; indeed the contrary is true.

A need therefore exists for a batch charger that makes it possible to overcome the jamming of the drive motor and limit the risks of damage to the motor and/or the conveying member, while preventing the generation of instabilities in the melting process and back flows of gas.

The present invention meets this need. More particularly, in at least one embodiment, the proposed technique relates to a batch charger for charging a glass forming batch into a glass furnace, said batch charger comprising:

a barrel defining a charging direction of the batch into the furnace, and a mechanical assembly provided with:

a member for conveying the batch to the furnace in the charging direction, this conveying member being at least partially arranged in the barrel, and a motorized unit for driving said conveying member, said batch charger being characterized in that the mechanical assembly is translatably mobile relative to the barrel, in the charging direction.

In the description below, the "mechanical assembly" is the group formed by the conveying member and the motorized drive unit, the assembly being limited by the maximum torque value of the motorized unit.

The invention is thus based on a novel, innovative concept that consists of providing a batch charger in which the mechanical assembly is translatably mobile relative to the barrel, in the charging direction. Such a batch charger enables a human operator and/or a machine to position the conveying member in the barrel depending on the charging conditions.

As described above, the position of the conveying member correlates to the value of the resistance exerted by the glass forming batch and/or the plug. When this member moves forwards in the barrel, the thickness of the plug decreases, as the end thereof is introduced into the furnace for liquefaction. As a result, the resistance decreases, enabling the achievement of an acceptable torque value for the drive motor while limiting the stresses on the conveying member, and the risks of damage. Conversely, when the conveying member moves backwards, the thickness of the plug increases, and the risks of ingress of combustion gases and/or sudden expulsion of the plug into the melting chamber decrease.

A batch charger according to the invention makes it possible, via the translation of the mechanical assembly relative to the barrel, to maintain this resistance value, and therefore the corresponding value of the motorized drive unit torque, within an intermediate range of values, making it possible to overcome the jamming of the drive motor and limit the risks of damage thereto and/or to the conveying member, while preventing the generation of instabilities in the melting process or back flows of gas.

In practice, the conveying member can be positioned in the barrel:

preventatively, in relation to the hardness and particle size of the batch introduced into the batch charger and the technical specifications of the batch charger, and/or during the operation of the batch charger, following the jamming of the conveying member, an excessive torque increase of the motorized drive unit, or the observation of any other malfunction of the batch charger.

According to a particular embodiment, the conveying member is a worm screw rotatably mobile about the charging direction. According to an alternative embodiment, the conveying member is in the form of a piston translatably mobile in the charging direction, or any other type of conveying member known from the prior art.

According to a particular embodiment, the barrel is rigidly connected to a chassis relative to which the mechanical assembly is translatably mobile.

The implementation of such a chassis enables the satisfactory control of the translation direction of the mechanical assembly, as well as the assembly and positioning, relative to the rest of the chassis, of any motorized unit for translating the mechanical assembly.

According to a particular embodiment, the mechanical assembly is suitable for being translated manually.

The positioning of the conveying member in the barrel can thus be modified by a specialist operator, in particular in the event of the jamming of the batch charger.

According to a particular embodiment, the batch charger comprises a motorized unit for translating the mechanical assembly.

An operator can thus be fully or partially assisted for the positioning of the mechanical assembly.

According to a particular embodiment, the mechanical assembly is suitable for being translated both manually and via a motorized translation unit. Such a combination of translation means enables an operator to overcome any failures of the motorized translation unit, for example to accurately adjust the position of the mechanical assembly, to take over from the motorized unit in the event that it breaks down, or to perform work requiring greater power than the maximum power value of the motorized translation unit.

According to a particular embodiment, the batch charger comprises a device for measuring at least one value of a physical variable affected by the operation of the batch charger, said physical variable preferably being selected from:

the torque supplied by the motorized drive unit of said conveying member, the temperature inside the barrel at the furthest downstream end thereof, i.e. closest to the furnace, the concentration of combustion gases inside the barrel, for example the carbon dioxide and/or carbon monoxide concentration.

Measuring the temperature inside the barrel makes it possible to detect any return of liquid glass and/or the start of pyrolysis in the conveying member.

The implementation of a measuring device according to this particular aspect of the invention makes it possible to monitor in real time the satisfactory operation of the batch charger in order to modify the position of the mechanical assembly along the charging axis if necessary.

According to a particular embodiment, the torque is measured by means of measuring the current intensity of said motor, which is proportional to the torque.

According to a particular embodiment, this measuring device is coupled to a human-machine interface suitable for communicating to an operator the measured value of said physical variable. The operator can then decide whether or not to modify the position of the mechanical assembly relative to the barrel, manually or with the assistance of a motorized translation unit.

According to a particular embodiment, the translation of the mechanical assembly is automated, which offers the possibility of automatically coupling the position of the conveying member to the torque, and therefore continuously adjusting the batch charger to the charging conditions, according to a control method described herein.

The invention also relates to a glass former melting installation comprising:

a glass former melting furnace provided with a charging orifice located in the tank wall, preferably below the theoretical level of the liquid glass defined by the position of the liquid glass spout, a batch charger as described above, one end of the batch charger barrel opening into the charging orifice.

The technical advantages conferred by a batch charger according to the invention, as described herein, also relate to a glass former melting installation incorporating such a batch charger.

One end of the barrel of the batch charger opens into the charging orifice, either by direct contact or via an intermediate connecting part. In this configuration, access to the furnace is freed at least intermittently, in order to enable the introduction of the glass forming batch into the furnace.

The invention relates more particularly to submerged batch chargers, given the risks of the back flow of liquid glass into the barrel and the pressure exerted by the liquid glass on the plug, as these two factors significantly increase the resistance exerted against the work of the conveying member, and therefore the risks of jamming and/or damage.

According to a particular embodiment, the installation comprises a tubular charging head arranged downstream of the barrel and fixed to the outer wall of the furnace tank, level with the charging orifice, said charging head being provided at the end thereof away from the furnace with a slide damper, the damper plate of which is mobile between a closed position, in which the damper plate closes off access to the inside of the furnace, and an open position, in which this access is freed.

The implementation of such a slide damper makes it possible, when it is in the closed position, to disconnect the batch charger from the furnace, for example for maintenance, without any risk of back flow of liquid glass. It must be noted that the translation function of the mechanical assembly is necessary to be able to close the furnace, in order to avoid the conveying member being in line with the damper plate when it is moved into the closed position.

According to a particular embodiment, said slide damper is vertically oriented. In this configuration, it is thus possible to arrange a plurality of batch chargers along the same wall of the furnace.

According to a particular embodiment, said charging head has a generally conical inner surface that widens from the end away from to the end close to the furnace.

This tapered design thus makes it easier, in the event that a plug forms, to push the plug into the furnace.

The invention also relates to the use of such an installation for melting glass formers.

The invention further relates to a method for controlling a batch charger as described above, on the basis of at least one value of a physical variable affected by the operation of the batch charger, said physical variable preferably being selected from:

the torque supplied by the motorized drive unit of said conveying member, the current intensity of the motor of said motorized drive unit, the temperature inside the barrel at the furthest upstream end thereof, said control method comprising at least the following steps:

comparing said measured value with at least one threshold value, and sending an instruction to translate the mechanical assembly, controlling the motorized unit for translating the mechanical assembly.

This threshold value can relate either to an operating fault of the batch charger that the operator wishes to avoid (e.g. jamming, breakage, extreme temperature) or conversely to an optimum operating value thereof to which the operator wishes to remain close.

It must be noted that according to alternative embodiments, the instruction to translate the mechanical assembly is either sent to a human-machine interface for subsequent execution by an operator, or sent directly to the motorized translation unit for automatic execution.

If said physical variable value is the torque supplied by the motorized drive unit of said conveying member, it has been observed that the value of this torque tends to decrease when the conveying member is moved forwards in the barrel towards the furnace, and vice versa. The control order sent in order to reduce this torque is therefore to translate the conveying member in the charging direction. Conversely, the control order sent in order to increase this torque is to translate the conveying member in the opposite direction.

According to a particular embodiment, the physical variable measured is the current intensity, proportional to the torque, of the motor of the motorized unit for rotating a worm screw for conveying the batch to the furnace, and said threshold value is initially between 10 and 50%, preferably between 10 and 30%, preferably between 12 and 20%, more preferably between 14 and 16% of the maximum permissible current intensity of said motor.

In this value range, the torque available as an absolute value makes it possible to solve any problem of jamming of the member for conveying the batch into the furnace.

According to a particular embodiment, the motor current intensity threshold value is 15% of the maximum permissible current intensity of the motorized drive unit. Depending on the sizing of the motor, the corresponding torque value is between 600 and 700 N/m.

According to a particular embodiment, the command to translate the mechanical assembly downstream of the theoretical cutting plane of the damper plate is coupled to the arrangement thereof in the open position.

This makes it possible to avoid any contact between the conveying member and the damper plate and therefore any damage that might result from this.

According to a particular embodiment, the physical variable measured is the temperature inside the barrel at the furthest upstream end thereof, the control order sent being to translate the conveying member backwards when the temperature measured is equal to or greater than a temperature threshold value.

The invention also relates to a system for controlling a batch charger as described above, comprising a processing module suitable for:

comparing at least one value of a physical variable affected by the operation of the batch charger with at least one threshold value, sending an instruction to translate the mechanical assembly.

The invention also relates to a computer program downloadable from a communication network and/or recorded on a recording medium suitable for being read by a computer and/or run by a processor, comprising an instruction code for implementing a control method as described above.

The invention also relates to a computer-readable recording medium, on which such a computer program is recorded.

Further features and advantages of the invention are described below, with reference to the drawings, in which.

Identical reference signs in the different figures denote similar or identical elements.

Figure 1:
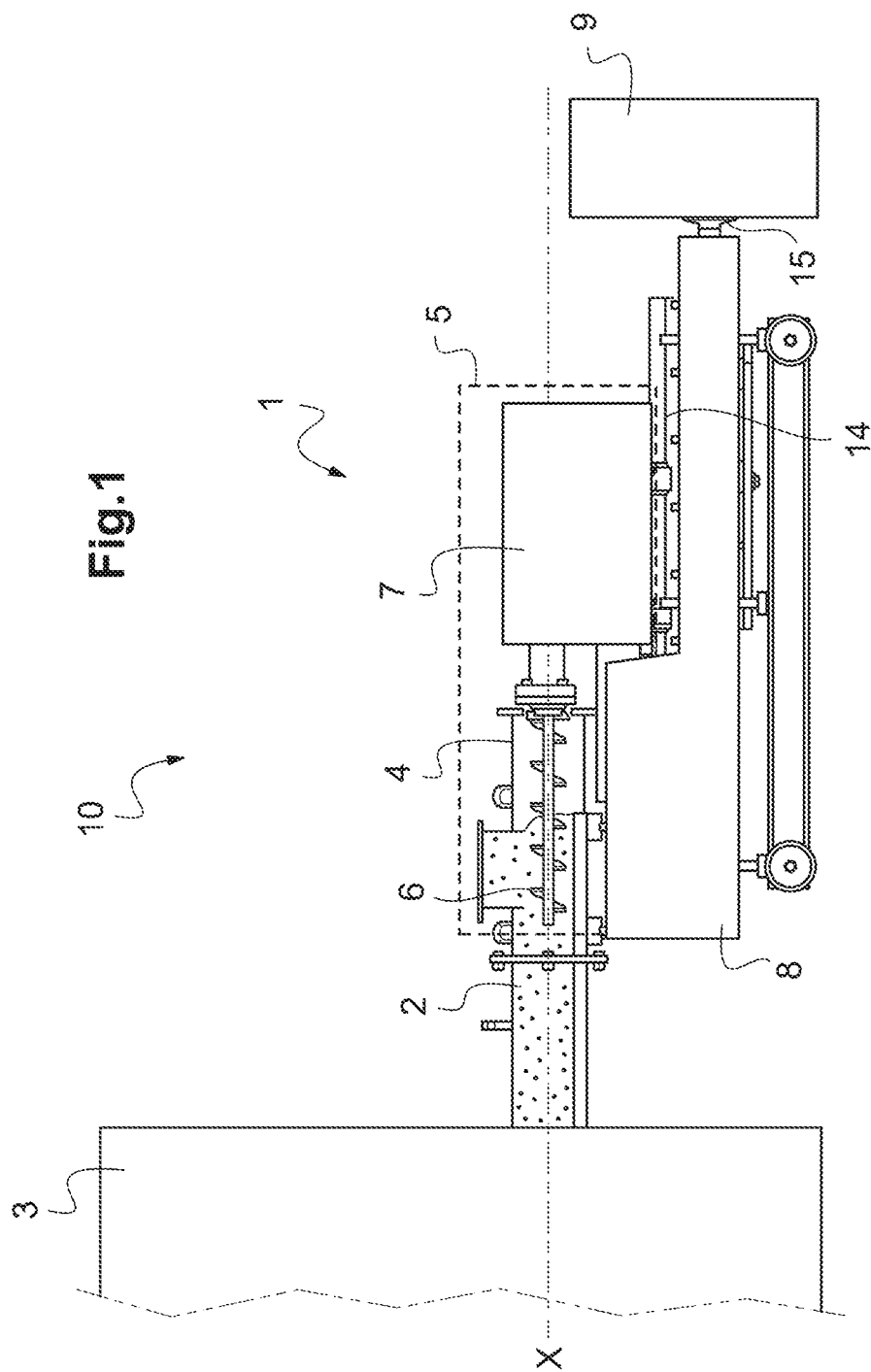
FIG. 1 is a cross-sectional schematic view of a glass former melting installation according to a particular embodiment of the invention.

According to a particular embodiment and as shown in FIG. 1, the invention relates to a glass former melting installation 10 comprising:

a glass former melting furnace 3 provided with a charging orifice in the tank wall, and a batch charger 1 according to the invention, one end of the barrel 4 of the batch charger 1 opening into the charging orifice so that the glass formers can be introduced into it.

According to the embodiment shown in FIG. 1, the charging orifice is located below the theoretical level of the liquid glass defined by the position of the liquid glass spout. This is known as a submerged type batch charger, to which the invention more particularly relates, given the risks of the back flow of liquid glass into the barrel 4 and the pressure exerted by the liquid glass on the plug, as these two factors significantly increase the resistance exerted against the work of the conveying member 6, and therefore the risks of jamming and/or damage.

According to an alternative embodiment, charging may however take place above the theoretical level of liquid glass, along a division wall and/or gable wall of the furnace 3.

The invention also relates to a batch charger 1 comprising:
a barrel 4 defining a direction X of charging a glass forming batch 2 into the furnace 3, and
a mechanical assembly 5 provided with:
a member 6 for conveying the batch 2 to the furnace 3 in the charging direction X, this conveying member 6 being at least partially arranged in the barrel 4, and
a motorized unit 7 for driving said conveying member 6.

In particular, the mechanical assembly 5 is translatably mobile relative to the barrel 4, in the charging direction X.

A batch charger 1 according to the invention makes it possible, via the translation of the mechanical assembly 5 relative to the barrel 4, to maintain this resistance value, and therefore the corresponding value of the motorized drive unit 7 torque, within an intermediate range of values making it possible to overcome the jamming of the drive motor and limit the risks of damage thereto and/or to the conveying member 7, while preventing the generation of instabilities in the melting process and back flows of gas.

Figure 2:
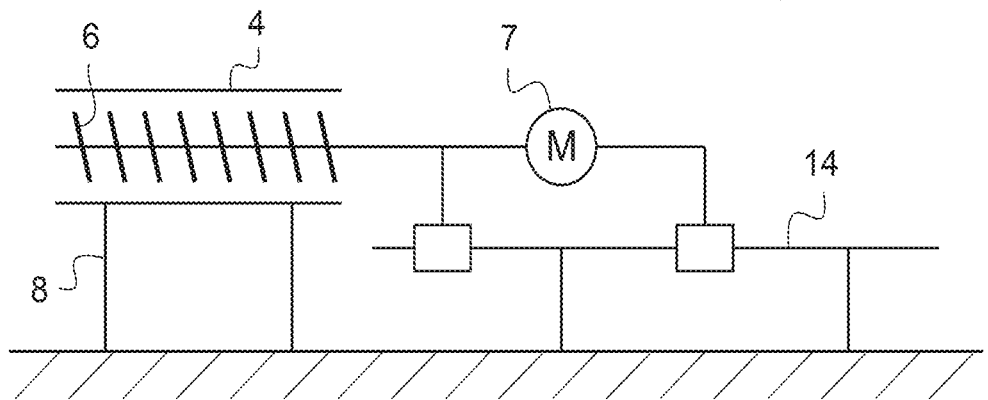
FIG. 2 is a kinematic diagram of a batch charger according to a particular embodiment of the invention.

According to the particular embodiments shown in FIGS. 1 and 2, the batch charger 1 comprises a barrel 4 inside which is housed a worm screw 6 rotatably mobile about the charging axis X. This worm screw 6 therefore acts as the member for conveying the batch 2 to the furnace 3. It must be noted that according to an alternative embodiment, the conveying member 6 can take the form of a piston translatably mobile in the charging direction X, or any other type of conveying member known from the prior art. Regardless of the type of conveying member 6, it is rotated/translated by a motorized unit 7 comprising one or more motors. The group formed by this conveying member 6 and the motorized drive unit 7 forms a mechanical assembly 5. A hopper on the barrel 4 makes it possible to introduce the raw material batch 2.

According to a particular embodiment (not shown), the batch charger head also comprises a slide damper and a tubular part for connection to the furnace. The slide damper comprises a fixed part and a mobile part, called the damper plate. A tubular connecting part is fixed to the fixed part of the damper, the internal surface of which widens slightly towards the furnace, only the tank wall of which is shown. The tubular connecting part is inserted into the charging orifice. The connecting part and the damper plate are each traversed by a system of internal pipes enabling the circulation of a coolant. When the damper plate is in the closed position, it closes off access to the inside of the furnace.

As shown in FIG. 1, the barrel 4 of the batch charger 1 is rigidly connected to a chassis 8 relative to which the mechanical assembly 5 is translatably mobile. More specifically, and as shown by the kinematic diagram in FIG. 2, the mechanical assembly 5 is fixed to a horizontal panel (not shown) that itself slides in the charging direction X, along side rails 14 rigidly connected to the chassis 8. The mechanical assembly 5 is translated relative to the chassis by means of a machine screw 15. It will be understood that according to alternative embodiments, the translational mobility of the mechanical assembly 5 relative to the barrel 4 can be implemented via any arrangement and/or type of mechanical connection known from the prior art, without however leaving the scope of the invention.

According to a particular embodiment of the invention (not shown), the translation of the mechanical assembly 5 is manually controlled, by means of a handwheel enabling the rotation of the machine screw 15. According to alternative embodiments, such translation can be controlled by means of a crank or any other known mechanical device with a similar function.

According to an alternative embodiment shown in FIG. 1, the translation is controlled by means of a motorized translation unit 9. An operator can thus be fully or partially assisted for the positioning of the mechanical assembly 5.

In order to guide decision-making regarding the translation of the mechanical assembly 5 in the barrel 4, the batch charger 1 is provided with a plurality of sensors including:
a sensor to measure the torque supplied by the motorized drive unit 7,
a temperature sensor positioned inside the barrel 4 at the end thereof intended for positioning close to the furnace, which makes it possible to detect any back flow of liquid glass and/or the start of pyrolysis in the worm screw 6,
a device for measuring the concentration of carbon dioxide and/or carbon monoxide from combustion, inside the barrel 4.

According to a particular embodiment, the different sensors are coupled to a human-machine interface (not shown) suitable for communicating the measured values to an operator. The operator can then decide whether or not to modify the position of the mechanical assembly 5 relative to the barrel 4, manually or with the assistance of a motorized translation unit 9.

According to an alternative embodiment shown in FIG. 1, the translation of the mechanical assembly 5 is automated, via a control system 20 described herein, which offers the possibility of automatically coupling the position of the screw 6 to the torque measured, and therefore continuously adjusting the batch charger 1 to the charging conditions, according to a control method described herein.

Figure 3:
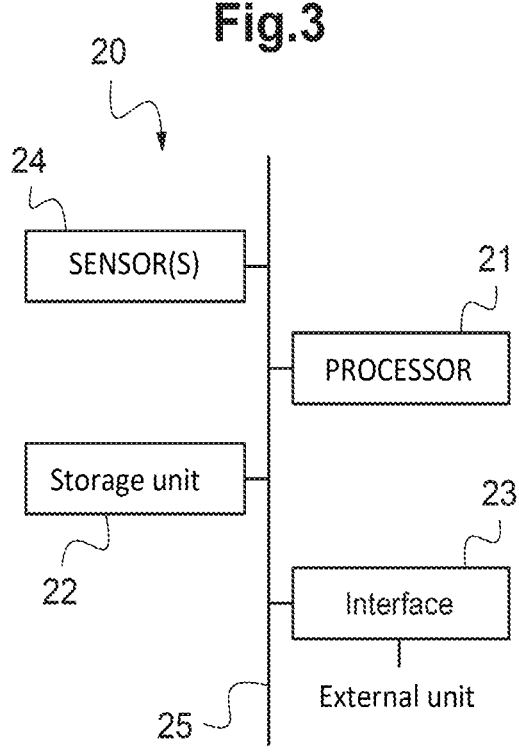
FIG. 3 is a schematic representation of a system for controlling a batch charger according to a particular embodiment of the invention.

Thus, the invention also relates to a system 20 for controlling a batch charger 1 as described herein. As shown in FIG. 3, such a control system 20 comprises a processor 21 acting as a processing module, a storage unit 22, an interface unit 23 and measurement sensors 24, these elements being interconnected by a bus 25.

The processor 21 controls the motorized unit 9 for translating the mechanical assembly 5. The storage unit 22 stores at least one program to be run by the processor 21, and various data, including the data collected by the measurement sensors 24, the parameters used by calculations performed by the processor 21, and the intermediate data of the calculations performed by the processor 21. The processor 21 can be made up of any known or appropriate hardware or software, or of a combination of hardware and software. The storage unit 22 can be made up of any appropriate storage or suitable means for storing the program and the data in a computer-readable manner. The program ensures that the processor 21 implements a control method as described herein.

The interface unit 23 provides an interface between the control system 20 and an external device. The interface unit 23 can in particular be connected to the external device via a cable or a wireless connection. In this embodiment, the external device can be a motorized unit 9 for translating the mechanical assembly 5 and/or another component of the batch charger 1. In this case, the values measured by the sensors 24 can be entered into the system 20 by means of the interface unit 23, then stored in the storage unit 22.

Although a single processor 21 is shown in FIG. 3, a qualified person will understand that such a processor can comprise different modules and units implementing the functions executed by the control system 20. These functions can also be performed by a plurality of interconnected processors 21.

Figure 4:
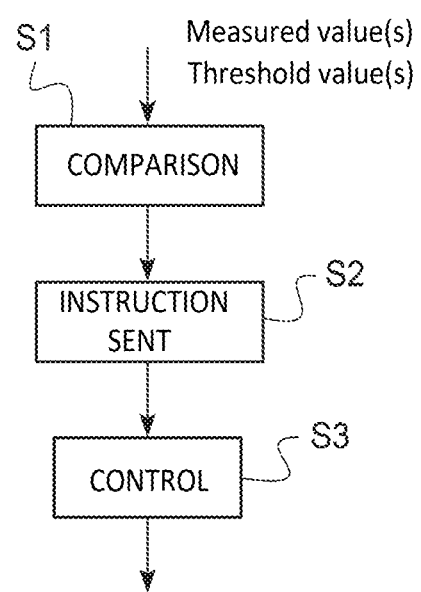
FIG. 4 is a flow diagram showing the successive steps of a method for controlling a batch charger according to a particular embodiment of the invention.

FIG. 4 is a flow diagram showing the successive steps of a method for controlling a batch charger 1 according to a particular embodiment.

During a first step (step S1), the following variables are compared:
- the value of the current intensity of the motor of the motorized unit 7 for rotating the worm screw 6, proportional to the torque of this motor, is compared to a threshold value set at 15% of the maximum permissible current intensity of the motor, which in this case corresponds to an optimum operating value to which the operator wishes to remain close, with a 5% margin of deviation,
- the temperature measured inside the barrel 4, at the furthest upstream end thereof, is compared to a temperature threshold value set at 50° C., which in this case corresponds to an extreme temperature that the operator wishes to avoid.

Priority is given in the control method to maintaining this temperature at the end of the barrel 4 below the threshold value of 50° C.

In practice, if the motor current intensity value measured (step S1) is greater than 20% of the maximum permissible current intensity, at a temperature of less than 50° C., the order is given (step S2) by the processor 21 to move the mechanical assembly 5 forwards (step S3) 1 cm towards the furnace 3. The motorized unit 9 for translating the mechanical assembly 5 is then controlled (step S3) according to this instruction.

Conversely, if the motor current intensity value measured (step S1) is less than 10% of the maximum permissible current intensity, at a temperature of less than 50° C., the order is given (step S2) to move the mechanical assembly 5 backwards (step S3) 1 cm.

However, if the temperature measured (step S1) is greater than or equal to 50° C., an order (step S2) is given prohibiting the movement of the mechanical assembly 5 forwards (step S3), regardless of the motor current intensity value measured (step S1). The only commands authorized in this case are maintaining the position of the mechanical assembly 5 and the backwards movement thereof.

Similarly, the command to translate the mechanical assembly 5 downstream of the theoretical cutting plane of the damper plate is coupled to the arrangement thereof in the open position, in order to prevent any contact between the worm screw 6 and the damper plate and therefore any damage that might result from this.

This control method is reiterated at a frequency of 10 minutes.

It must be noted that according to alternative embodiments, this control method can be implemented on the basis of different types of measurement, different threshold values, and/or at different iteration frequencies.

The invention claimed is:

1. A batch charger for charging a glass forming batch into a glass furnace, said batch charger comprising:
   a barrel defining a charging direction of the batch into the furnace,
   a measurement device for measuring at least one value of a physical variable affected by operation of the batch charger, and
   a mechanical assembly provided with:
   a conveying member for conveying the batch to the furnace in the charging direction, said conveying member being at least partially arranged in the barrel, and
   a first motorized unit for driving said conveying member,
   wherein the mechanical assembly is translatably mobile relative to the barrel, in the charging direction, to enable translation of the conveying member in the barrel to adjust, based on the at least one measured value of the physical variable, a position of the conveying member in the barrel along the charging direction, and
   wherein the physical variable is selected from:
   a torque supplied by the first motorized unit of said conveying member,
   a current intensity of a motor of said first motorized unit,
   a temperature inside the barrel at an end thereof, and
   a concentration of combustion gases inside the barrel.

2. The batch charger as claimed in claim 1, wherein the barrel is rigidly connected to a chassis relative to which the mechanical assembly is translatably mobile.

3. The batch charger as claimed in claim 1, wherein the mechanical assembly is configured to be translated manually.

4. The batch charger as claimed in claim 1, further comprising a second motorized unit for translating the mechanical assembly.

5. A glass former melting installation comprising:
   a glass former melting furnace provided with a charging orifice located in an outer wall of the glass former melting furnace, and
   a batch charger as claimed in claim 1, one end of the barrel of the batch charger opening into the charging orifice.

6. The installation as claimed in claim 5, further comprising a tubular charging head arranged downstream of the barrel and fixed to the outer wall of the glass former melting furnace, level with the charging orifice, said charging head being provided at the end thereof away from the glass former melting furnace with a slide damper, the damper plate of which is mobile between a closed position, in which the damper plate closes off access to the inside of the furnace, and an open position, in which said access is freed.

7. A method comprising melting glass with the installation as claimed in claim 5.

8. The installation as claimed in claim 5, wherein the charging orifice is below a level of the liquid glass defined by a position of the liquid glass spout.

9. A non-transitory computer-readable recording medium on which a computer program is recorded, said computer program comprising instruction codes for implementing a control method as claimed in claim 1.

10. A method for controlling a batch charger, on the basis of at least one measured value of a physical variable affected by operation of the batch charger, said batch charger including (a) a barrel defining a charging direction of the batch into the furnace, (b) a measurement device for measuring said at least one measured value, and (c) a mechanical assembly provided with a conveying member for conveying the batch to the furnace in the charging direction, said conveying member being at least partially arranged in the barrel, and with a first motorized unit for driving said conveying member, and (d) a second motorized unit for translating the mechanical assembly, said control method comprising:

comparing said measured value with at least one threshold value, sending an instruction to translate the mechanical assembly, and controlling the second motorized unit for translating the mechanical assembly to translate the conveying member in the barrel to adjust, based on the measured value of the physical variable, a position of the conveying member in the barrel along the charging direction, wherein the physical variable is selected from a torque supplied by the first motorized unit of said conveying member, a current intensity of a motor of said first motorized unit, a temperature inside the barrel at an end thereof, and a concentration of combustion gases inside the barrel.

11. The control method as claimed in claim 10, wherein the physical variable measured is the current intensity of a motor of the first motorized unit for rotating a worm screw for conveying the batch to the furnace, and wherein said threshold value is initially between 10 and 50% of the maximum permissible current intensity of said motor.

12. The control method as claimed in claim 11, wherein the threshold value is initially between 10 and 30% of a maximum permissible current intensity of said motor.

13. The control method as claimed in claim 12, wherein the threshold value is initially between 14 and 16% of the maximum permissible current intensity of said motor.

14. The control method as claimed in claim 10, wherein the batch charger is part of a glass former melting installation that includes a glass former melting furnace having an outer wall provided with a charging orifice, wherein one end of the barrel of the batch charger opens into the charging orifice, wherein the glass former melting installation further includes a tubular charging head arranged downstream of the barrel and fixed to the outer wall of the glass former melting furnace, level with the charging orifice, said charging head being provided at an end thereof away from the glass former melting furnace with a slide damper having a damper plate, which is mobile between a closed position, in which the damper plate closes off access to an inside of the glass former melting furnace, and an open position, in which said access is freed, wherein a command to translate the mechanical assembly downstream of the damper plate is coupled to a position of the damper plate to prevent any contact between the conveying member and the damper plate.

15. The control method as claimed in claim 10, wherein the physical variable measured is a temperature inside the barrel at an end thereof, the method comprising sending a control order to translate the conveying member backwards when the temperature measured is equal to or greater than a temperature threshold value.

16. A computer program downloadable from a communication network and/or recorded on a recording medium suitable for being read by a computer and/or run by a processor, comprising an instruction code for implementing a control method as claimed in claim 10.

17. The method as claimed in claim 10, wherein said physical variable is selected from:

a torque supplied by the first motorized unit of said conveying member, a current intensity of a motor of said first motorized unit, and a temperature inside the barrel at an end thereof.

18. A system for controlling a batch charger for charging a glass forming batch into a glass furnace, said batch charger including (a) a barrel defining a charging direction of the batch into the furnace, (b) a measurement device for measuring at least one value of a physical variable affected by operation of the batch charger, and (c) a mechanical assembly provided with a conveying member for conveying the batch to the furnace in the charging direction, said conveying member being at least partially arranged in the barrel, and with a first motorized unit for driving said conveying member, the system comprising a processing module suitable for:

comparing the measured at least one value of the physical variable affected by the operation of the batch charger with at least one threshold value, sending an instruction to translate the mechanical assembly so as to translate the conveying member in the barrel to adjust, based on the measured at least one value of the physical variable, a position of the conveying member in the barrel along the charging direction, wherein the physical variable is selected from:

a torque supplied by the first motorized unit of said conveying member, a current intensity of a motor of said first motorized unit, a temperature inside the barrel at an end thereof, and a concentration of combustion gases inside the barrel.

* * * * *